Patented May 31, 1927.

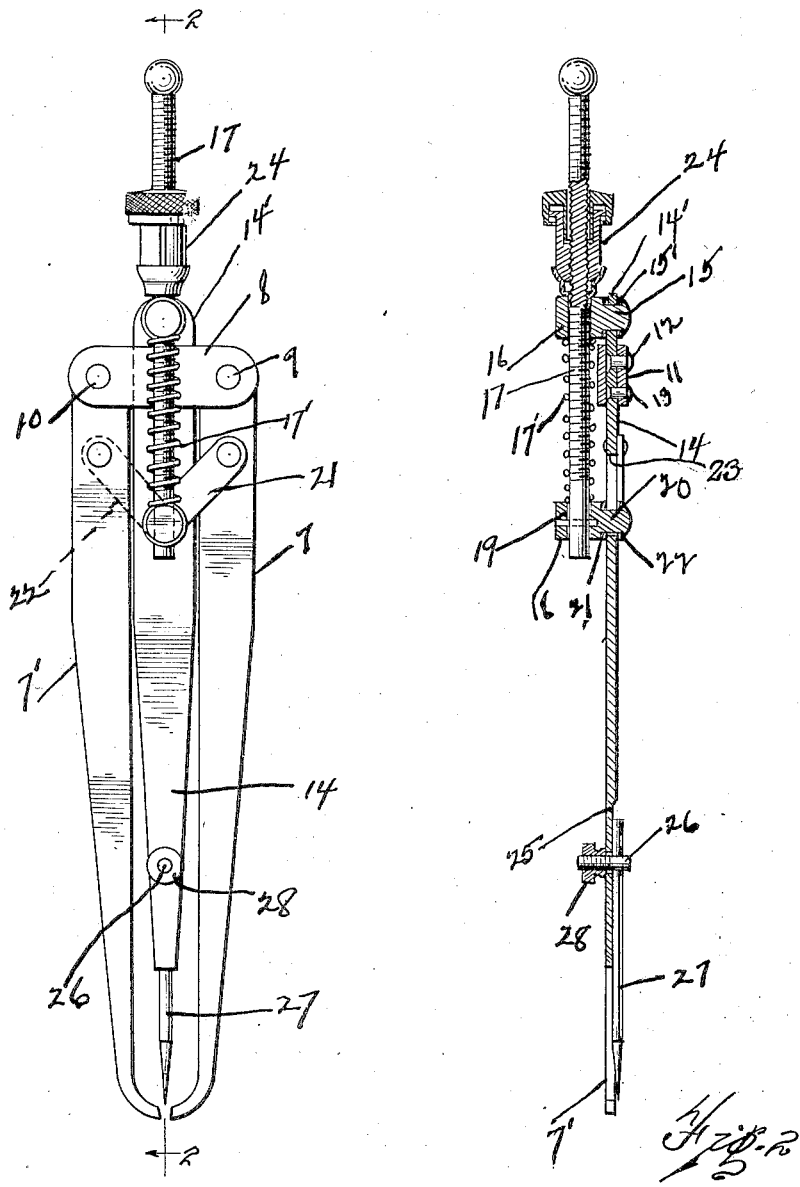

1,630,505

UNITED STATES PATENT OFFICE.

FRANK WALTHER, OF DETROIT, MICHIGAN.

CENTERING CALIPERS.

Application filed December 21, 1923. Serial No. 681,983.

My invention relates to a new and useful improvement in a centering calipers and is especially adapted for use in determining the center of a work-piece on which a mechanic is working or which he is to use. In centering calipers as now used there seems to be no means for positively determining the center of the work piece, most devices indicating the center only approximately and necessitating the checking of the indication. It is an object of the present invention to provide means for positively indicating the center of the work piece in such a way that no checking of the instrument used will be necessary.

Another object of the invention is the provision of a centering caliper which may be used as an outside caliper as well.

Another object of the invention is the provision of a centering caliper which will be simple in structure, economical of manufacture and highly efficient in use.

The invention consists in the combination and arrangement of parts hereinafter described and claimed.

The invention will be best understood from a reference to the accompanying drawings which form a part of this specification and in which, Fig. 1 is a side elevational view of the invention, and, Fig. 2 is a sectional view taken on substantially line 2—2 of Fig. 1.

The invention in its preferred form comprises a pair of outside caliper arms 7 and 7' which are pivotally connected by suitable rivets 9 and 10, respectively, to a cross link 8, said link 8 extending transversely of a center leg 14, adjacent the upper end thereof. In alignment with the link 8, is a link 11 which is fixedly attached by suitable rivets 12 and 13, to the center leg 14, adjacent the upper end 14' thereof, said upper end 14' being adapted to project beyond the links 8 and 11. A neck 15 which projects from a nut 16 extends through an opening formed in the portion 14' and is flattened over a washer positioned between the end thereof and the portion 14'. The use of this washer is not essential and may be dispensed with, as may other minor parts herein described. The nut 16 is a blank nut in which is positioned a threaded stem 17 attached adjacent one end to an operating head 18 having a neck 20 which extends through an elongated slot 23 formed in the center leg 14. The head 18 is provided with a bore in which the end of the stem 17 is fixedly attached by means of a key, or a pin, or by a press fit. Mounted pivotally upon the neck 20 is one end of a link 21, the other end of which is pivotally mounted on the arm 7. Pivotally mounted on the neck 20, at the opposite side of the member 14 is one end of a link 22, the other end of which is pivotally attached to the arm 7'. The neck 20 is then turned down to retain these members in their assembled relation. Mounted on the stem, in embracing relation, is a coil spring 17', one end of which engages the nut 16 and the other end of which engages the head 18 so as to normally tend to maintain the arms 7 and 7' in the closed position as shown in Fig. 1. In order to open the arms 7 and 7' it is necessary to move the stem upwardly of the free ends of these arms against the tension of the spring 17. This movement carries with the stem the links 21 and 22, causing the same to move toward a parallel relation with each other and thus spreading the arms 7 and 7'. To effect this movement of the stem a nut 24, having an interiorly threaded bore is mounted on the stem 17. A turning of this nut will cause the desired movement of the stem 17.

The center leg 14 is provided adjacent its free end with a groove 25 in which may be positioned an indicating needle or pointer 27, having the end thereof pointed, for obvious purposes. Projected through an opening formed in the leg 14 is a stud 26 which is provided with an opening for the reception of the pointer 27. This stud 26 is threaded on one end and provided with a nut 28 whereby the pointer 27 may be clamped to the leg 14.

In operation the arms 7 and 7' are extended the proper distance by adjustment through the nut 24 until these arms engage the sides of the work piece. The pointer 27 will then indicate the center of the work piece and be used for marking the same. It will be noted that this pointer may be adjusted in its mountings depending upon the degree of extension of the arms 7 and 7'. It is also apparent that by removing the pointer the device may be used as an ordinary outside caliper.

While I have illustrated and described the preferred form of structure I do not wish to limit myself to the precise details of construction shown, but desire to avail myself of such variations and modifications as come within the scope of the appended claim.

Having thus described my invention what I claim as new and desire to secure by Letters Patent is:

A caliper of the class described, comprising a stationary leg; a pair of cross bars mounted fixedly on said leg, at opposite sides thereof, intermediate its ends, adjacent the upper end thereof and projecting outwardly therefrom at opposite sides; a pair of movable arms, each pivotally connected, adjacent its upper end, between the outer ends of said cross bars; a pair of links, each pivotally connected at one end to one of said movable arms at opposite sides thereof; a head having a bore formed therein; a neck on said head projected through an opening formed in said leg, adjacent the upper end thereof, the end of said neck being upturned to prevent its removal from said opening; a similar head having a neck projecting through a longitudinally extending slot formed in said leg, said neck being upturned to prevent the removal of said neck from said slot, the opposite ends of said links being connected to said last mentioned neck at opposite sides of said leg; a stem projected through said bore in said first mentioned head and secured in said bore in said second mentioned head; a coil spring loosely positioned on said stem, intermediate said heads, and adapted for engaging at its opposite ends, said heads; and a nut threaded on said stem for effecting relative movement of said heads, said relative movement effecting a swinging of said movable arms on their mountings.

In testimony whereof I have signed the foregoing specification.

FRANK WALTHER.